May 13, 1947.　　　　　M. DIETRICH　　　　　2,420,587
SELF-THREADING DEVICE FOR PROJECTORS
Filed May 15, 1945　　　　2 Sheets-Sheet 1
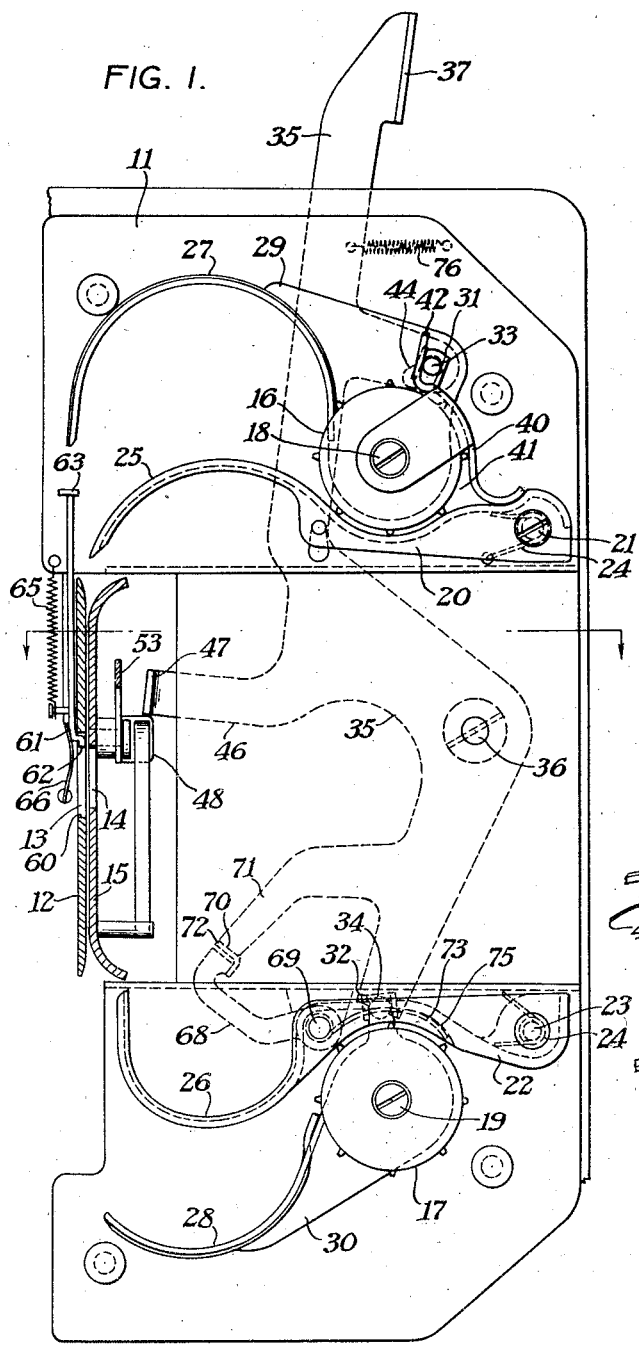
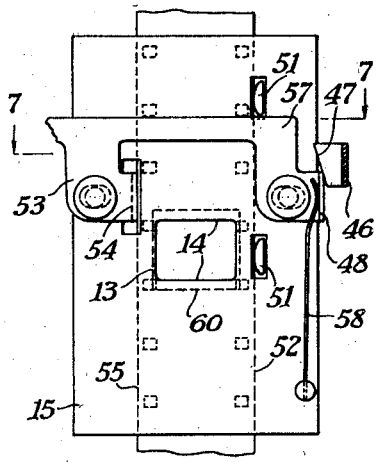
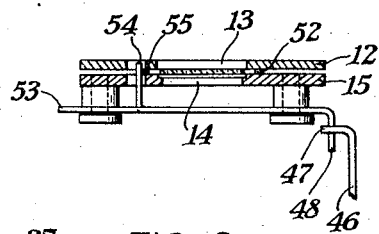
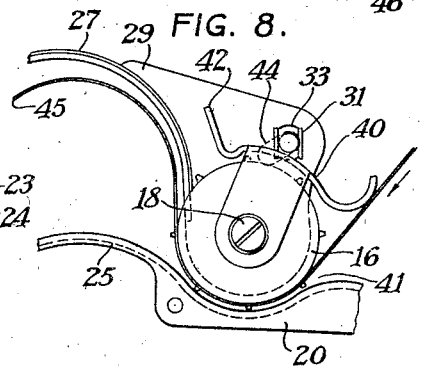
MICHAEL DIETRICH
*INVENTOR*
BY
*ATTORNEYS*

May 13, 1947.                M. DIETRICH                2,420,587
SELF-THREADING DEVICE FOR PROJECTORS
Filed May 15, 1945                    2 Sheets-Sheet 2
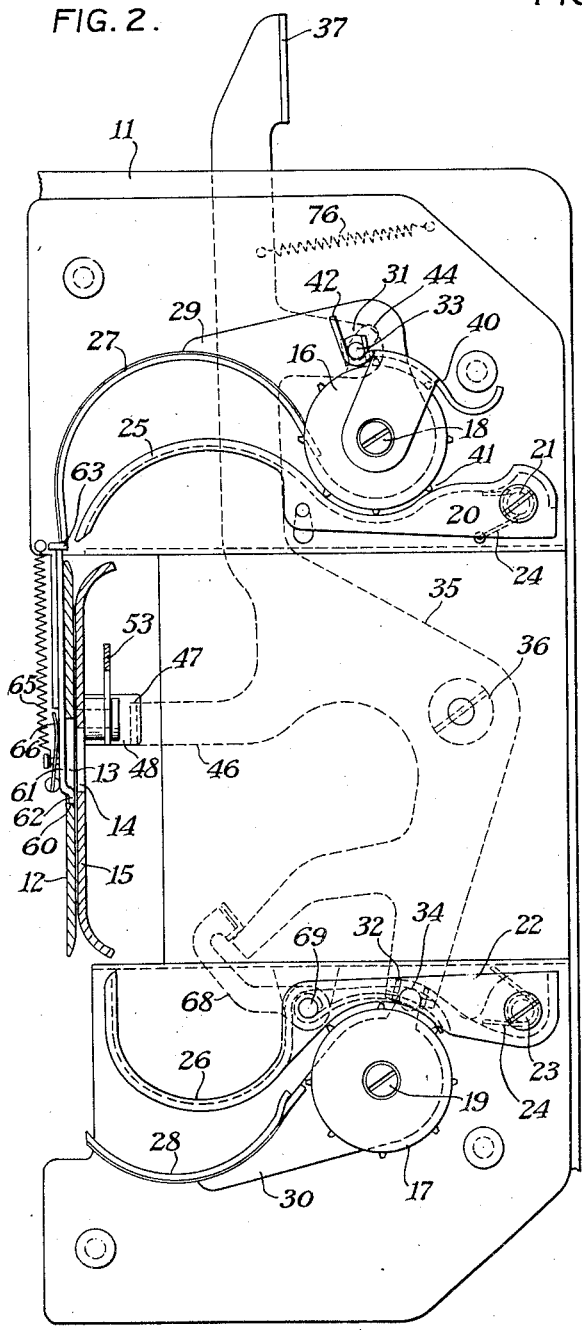
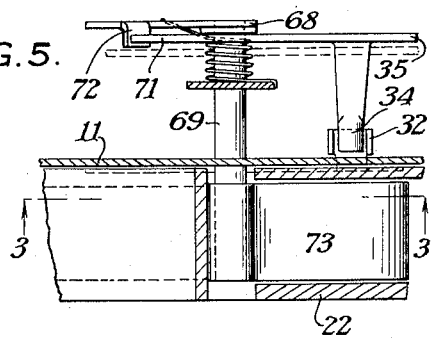
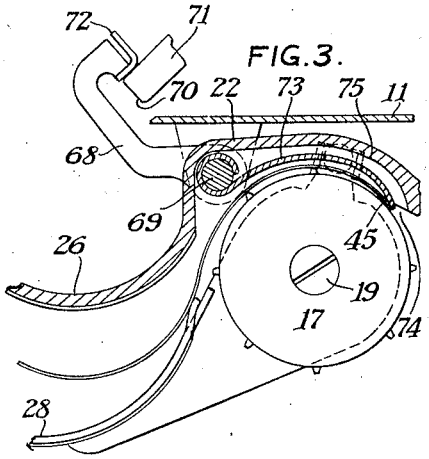
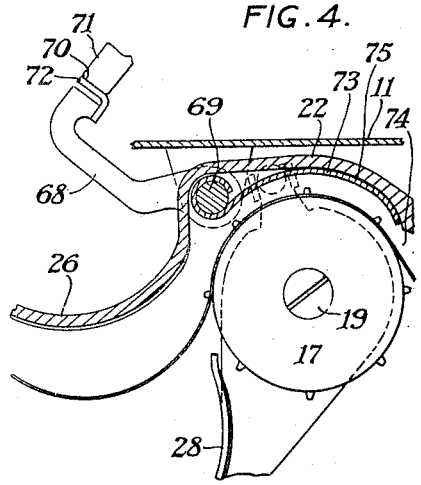
MICHAEL DIETRICH
INVENTOR
ATTORNEYS Patented May 13, 1947

2,420,587

UNITED STATES PATENT OFFICE 2,420,587

SELF-THREADING DEVICE FOR PROJECTORS

Michael Dietrich, Rochester, N. Y., assignor to Eastman Kodak Company, Rochester, N. Y., a corporation of New Jersey Application May 15, 1945, Serial No. 593,778

13 Claims. (Cl. 88—17)

The present invention relates to motion picture projectors, and more particularly to a self-threading mechanism for such projectors.

In most projectors now on the market, the film strip must be manually threaded through the various film guides, film gate, and feed sprockets of the projector. Such a method of threading is highly undesirable; and, with some designs, is quite difficult particularly when the operator is not familiar with the apparatus.

In order to overcome these difficulties, the present invention provides a construction by which, when the parts are manually moved to a threading position, the projector may be automatically threaded and all the operator has to do is to insert the leading edge of the film into the film entrance and into engagement with the feeding mechanism. The positioning of the parts for threading also serves to move a pair of loop-forming members into loop forming position, and to move a blocking member out of blocking relation with the film entrance to permit the insertion of the film thereinto. A guide is also positioned at the gate to guide the leading edge of the film thereacross and to prevent the catching of the edge on the gate aperture. The film strip is then fed through the mechanism and when the threading operation is complete, means controlled by the leading edge of the film serves to actuate a trip so that the part will be automatically returned to the running or operating position. When the trailing end of the strip passes through the entrance, the blocking member automatically drops to a blocking position to effectively prevent the insertion of film until the parts have been moved to a threading position.

The present invention has, therefore, as its principal object the provision of a self-threading mechanism for a motion picture projector.

A still further object of the invention is the provision of an arrangement by which the parts are automatically returned to their operating positions at the completion of the threading operation.

A still further object of the invention is the provision of an arrangement which effectively prevents the insertion of the film strip into the projector until the parts have been moved to a threading position.

Yet another object of the invention is the provision of a guide member for guiding the leading edge of the film through the gate and past the gate aperture to prevent said edge from sticking on the aperture during the threading operation.

To these and other ends, the invention resides in certain improvements and combinations of parts, all as will be hereinafter more fully described, the novel features being pointed out in the claims at the end of the specification.

In the drawings:

Fig. 1 is a vertical view through a portion of a motion picture projector showing the relation of the parts when the projector is in its operating or nonthreading position;

Fig. 2 is a view similar to Fig. 1, but showing the relation of the parts in position for threading;

Fig. 3 is a fragmentary vertical sectional view through a portion of the mechanism illustrated in Figs. 1 and 2, showing the position of the trip mechanism just prior to the actuation thereof by the leading edge of the film strip;

Fig. 4 is a view similar to Fig. 3, but showing the relation of parts just after the tripping operation;

Fig. 5 is a plan view, with parts in section, of the trip mechanism illustrated in Figs. 3 and 4.

Fig. 6 is a front view of a portion of the film gate, showing the relation of the film edge guides;

Fig. 7 is a sectional view through the film gate and edge guides taken substantially on lines 7—7 of Fig. 6; and Fig. 8 is a fragmentary view of a portion of the apparatus showing the position of the entrance blocking member during the running or normal operation of the projector.

Similar reference numerals throughout the various views indicate the same parts.

The self-threading mechanism of the present invention is mounted on a plate or support 11, as shown in Figs. 1 and 2. A film gate, which is not carried by the plate 11, has a plate 12 formed with an aperture 13 arranged in alignment with a smaller aperture 14 formed in a pressure plate 15 which cooperates with the plate 12 to retain the film strip in a plane during the passage thereof through the gate. This film gate is positioned between upper and lower constantly driven film feeding sprockets 16 and 17 respectively which are carried by shafts 18 and 19 suitably secured to the plate 11. These feed sprockets are connected to a suitable driving means, not shown, and serve to propel the film strip through the projector during the threading operation as well as when projected in a manner well known to those in the art.

A sprocket clamp 20 pivoted at 21 to the plate 11 serves to hold the film strip against the upper sprocket 16, while a similar clamp 22 pivoted at 23 on plate 11 holds the film against the lower sprocket 17. Springs 24, only one of which is shown, are associated with the pivots 21 and 23 and yieldably retain the clamps 20 and 22 in contact with the sprockets 16 and 17. The forward or left end of the clamps 20 and 22, as viewed in Figs. 1 and 2, are curved, as shown at 25 and 26 and cooperate with movable loop-forming members 27 and 28 of the shape best shown in land 2 to form protective loops of film above and below the gate, for the purpose well known in the motion picture art.

When the projector is to be threaded, the loop-formers 27 and 28 are moved, by mechanism to be later described, to the position shown in Fig. 2, but when the threading operation has been completed and the film loops have been formed, the loop-formers are retracted to the position shown in Fig. 1. Such movement is secured by providing the formers 27 and 28 wtih plates 29 and 30 respectively, loosely mounted on the shafts 18 and 19 whereby the frames are rockably or pivotally mounted on the plate 11. These plates 29 and 30 are provided with bifurcated members 31 and 32 adapted to receive projection pins or lugs 33 and 34 formed on an actuating or control lever 35 pivoted at 36 on plate 11. It will now be apparent that movement of the lever 35 about its pivot in a counter-clockwise direction will serve to rock the loop-formers 27 and 28 about the sprocket shafts 18 and 19 to the loop-forming position shown in Fig. 2. The lever 35 is provided with a finger operating portion 37 by which the lever 35 may be shifted to move the loop-formers into and out of loop-forming position.

Before the film strip is fed into the projector for threading, it is desirable to have the loop-formers in the loop-forming position. Otherwise, the film may tend to pile up and become tangled, the disadvantages of which are obvious. For this reason, the present invention provides a device which will positively prevent the introduction of the film strip into the projector until the parts have been positioned for threading, as shown in Fig. 2. To this end, a blocking member 40 of the shape best shown in Figs. 1 and 2 is loosely mounted on the upper sprocket shaft 18 and when free will fall down and cooperate with the upper sprocket clamp 20, as shown in Fig. 1, to effectively and positively block the film entrance 41 to prevent the feeding of the film strip to the upper sprocket 16. However, in order to thread and operate the projector the member 40 must be moved to an inoperative or non-blocking position, as shown in Fig. 2. This result can be secured by providing a releasable connection between the blocking member 40 and the lever 35 so that when the latter is moved to the threading position, the member 40 will be moved to uncover the entrance 41, as illustrated in Fig. 2. In order to provide this releasable connection, the blocking member 40 is formed with an upturned portion 42 adapted to be engaged by the pin 33 carried by the lever 45 and projecting through a slot 44 formed in the plate 11.

It will now be apparent that when the lever 35 is moved from the position shown in Fig. 1 to that shown in Fig. 2, the loop-formers 27 and 28 will be moved to their loop-forming positions. Simultaneously therewith, the pin 33 will engage the upturned end 42 of the blocking member 40 and will rock the latter in a counter-clockwise direction to the position shown in Fig. 2 to uncover the film entrance 41 to permit the leading end 45 of the film strip to be inserted thereinto and into engagement with the upper feed sprocket 16.

At the completion of the threading operation, the lever 35 and loop-formers 27 and 28 are returned, by means to be later described, to the position shown in Fig. 1. During this movement, the pin 33 will move out of contact with the upturned end 42 and the blocking member will ride freely on the film strip, as shown in Fig. 8. Thus the blocking member is connected to the lever 35 only during the loop-forming operation, but is disconnected therefrom when the projector is set for running. However, when the trailing end of the film finally passes the blocking member, the latter will automatically fall in the position shown in Fig. 1 to cooperate with the sprocket clamp 20 to block the entrance 41 to prevent subsequent threading of the film until the members have been moved to the threading position shown in Fig. 2.

During the threading operation, it is common practice to relieve the pressure of the film strip at the film gate. Such a release can be secured either by moving the rear gate member 15, as shown in Fig. 1, or by moving an edge guide shown in Figs. 6 and 7. To secure this result the lever 35 may be provided with an arm 46, the free end of which is provided with a cam 47 adapted to engage a lug 48 extending rearwardly from the gate member 15. When the lever 35 is moved to the position shown in Fig. 2, the cam 46 engages the lug 48 and moves the plate 15 to the rear to thus open the gate to permit the free passage of the film therethrough.

As an alternative construction, edge film guides, shown in Figs. 6 and 7, may be positioned at the film gate and comprise a pair of stationary guide members 51 adapted to engage one edge 52 of the film strip and a spring-pressed member 53 formed with a lug or lugs 54 adapted to engage the other edge 55 of the strip, all as shown in Fig. 6. With this arrangement, the cam 47 on arm 45 is adapted to engage the cam 48 which, in this case, is formed on the end of the member 53 to shift the latter to the left against the section of spring 58 when the lever 35 is moved to the position shown in Fig. 2 to release the pressure on the edge of the film at the gate during the threading operation. When, however, the lever 35 is returned to the position shown in Fig. 1, the cam 47 moves out of contact with the lug 48 and the spring 58 then returns the lug 54 into engagement with the edge 55 of the film strip.

As the film strip is fed lengthwise into the film gate, there is a possibility that the leading end 45 may catch on the bottom edge 60 of the aperture 13 of the film gate member 12. This is particularly true if the leading end is cut at an angle rather than straight across the film. Also, during such threading, it is desirable to block off the projection aperture so that the movement of the leader strip through the projector will not be visible on the projection screen. The present invention, therefore, provides a slide member 61 which is positionable over the projection aperture during the threading operation, and is provided with a lower inturned lip 62 which extends through the aperture 13 and projects a few thousandths of an inch over the edge 60 to effectively guide the leading end 45 of the film strip to thus prevent any catching of the film strip in the gate, the disadvantages of which are already apparent to those in the art.

In order that the closing of the projection aperture may be in proper timed relation to the threading operation, the closing movement of the slide member 61 is controlled from the upper loop-former 27. To this end, the upper end of the slide member 61 is provided with an actuating portion 63 adapted to be engaged by the free end of the loop-former 27, as shown in Fig. 2. As the loop-former is moved from the position shown in Fig. 1 to that shown in Fig. 2 it will engage and move the slide member 61 downwardly to close the projection aperture and to bring the lip 62 into a position to overlie the edge 60, the member 61 being suitably guided during such movement. A spring 66 serves to retain the slide member 61 and lip 62 in proper position. When, however, the lever 35 is moved to the position shown in Fig. 1, the end of the loop-former 27 is moved away from the slide member 61. A releasable connection is thus provided between the loop-former 27 and the slide member 61. As the latter is now free, it is moved upwardly to an inoperative position shown in Fig. 1 by means of a spring 65 one end of which is anchored to plate 11 while the other end is secured to the slide member 61.

By means of the above-described mechanism, movement of the lever 35 to the position shown in Fig. 2 serves to open the film entrance 41, to move the loop-formers 27 and 28 to the loop-forming position, to release the film pressure at the gate, close the projection aperture and provide a guide 62 for the leading end 45 of the film in the film gate. When the parts have been thus moved to the position shown in Fig. 2, they must be held in that position until the completion of the threading operation. This holding is accomplished by means of a rockable arm 68 pivoted at 69 on plate 11 adjacent the lower feed sprocket 17. A spring, not shown, is wrapped around the pivot 69 and tends to rotate the arm 68 in a clockwise direction. When the lever 35 is moved about its pivot from the position shown in Fig. 1 to that shown in Fig. 2, the free end 70 of a lug 71, carried to the lever 35, slides over the upturned end 72 of the arm 68 until the parts reach the position shown in Fig. 2, whereupon the arm 68 snaps behind the lug 71 to hold the latter and thus retain the parts in threading position shown in Fig. 2. The single arm 68 thus serves to hold the entire mechanism in a threading position. When, however, the threading operation is completed the parts are returned to the position shown in Fig. 1, as will be later described.

This return movement is initiated by an arcuate shaped trip member 73 secured to or formed integral with the arm 68 and positioned in the film exit 74 between the lower sprocket 17 and the lower sprocket clamp 22, as best shown in Figs. 3 and 4. This trip, when the parts are in the position shown in Fig. 2, extends into the exit 74 and into the path of the leading end 45 of the film strip as clearly shown in Fig. 3. As the film strip is fed through the apparatus, the leading end 45 finally reaches the position shown in Fig. 3. Further feeding of the strip causes the end 45 to engage and move the trip 73 counter-clockwise to the position shown in Fig. 4 in which the trip is received in a recess 75 formed on the under side of the sprocket clamp 22 and in a position out of the exit 74 so as not to interfere with the free passage of the film strip therethrough. Such movement of the trip 73 similarly moves the arm 68 out of holding relation with the lug 71 to thus release the lever 35. The latter then returns, under the action of a spring 76, to the position shown in Fig. 1, the other parts being also returned, as above described. When the lever 35 reaches the position shown in Fig. 1, the end 70 of the lug 71 then registers with the upturned end 72 of the arm 68 to hold the latter so as to retain the trip 73 in the position shown in Fig. 4 and out of the exit 74. The arm 68 thus serves to hold the lever 35 to retain the parts in threading position during the threading operation, and, is, in turn, held by the lug 71 when the parts are in the operating or running position to maintain the exit open so that the film strip can pass freely therethrough.

The operation of the parts may be briefly summarized as follows:

With the parts in position shown in Fig. 1, the lever 35 is moved in a counter-clockwise direction. This move serves to shift the blocking member 40 to open the film entrance 41, to lock the loop-formers 27 and 28 in the loop-forming position, open the film-gate or by moving the spring-pressed member 53 to relieve the film pressure at the gate, then move the slide member 61 downwardly to close the projection aperture and to position the lip 62 to guide the leading edge of the film over the edge 60 at the gate aperture. When the parts reach the position shown in Fig. 2, at which time the parts are in the proper position for threading, the lug 71 slips off the end 72 of the arm 68 and the latter holds the lever 35 to retain the parts in their threading position. The leading end 45 of the film strip is then inserted in the entrance 41 into engagement with the upper drive sprocket 16. The latter then feeds the strip to the upper loop, through the film gate and the lower loop to the lower feed sprocket 17 and the feed exit 74. At this point, the leading end 45 of the film strip engages and moves the trip 73 which rocks the arm 68 to disengage the lever 35, which is then returned to the position shown in Fig. 1 by a spring 76. This then positions the parts in running position, as shown in Fig. 1, and brings the end 70 of the lug 71 against the end 72 of the arm 68 to thereby retain the trip 73 out of the exit so as to permit the free passage of film therethrough. During projection, the block member 40 rides on the film strip, as shown in Fig. 8. When, however, the trailing end of the strip passes the blocking member the latter automatically drops to the position shown in Fig. 1 to effectively block the entrance 41 to prevent the insertion of subsequent film strips until the parts have been moved to the threading position.

While one embodiment of the invention has been disclosed, it is to be understood that the inventive idea may be carried out in a number of ways. This application is, therefore, not to be limited to the precise details described but is intended to cover all variations and modifications thereof falling within the scope of the appended claims.

I claim:

1. A self-threading mechanism for a motion-picture projector having a film exit comprising, in combination, means for feeding and guiding a film strip through said projector, a pair of movable loop formers positioned adjacent said feeding means and adapted to form a pair of loops in said strip, a single pivoted lever directly connected to both of said formers and movable in one direction to position said loop formers in loop forming relation, means rendered operative upon movement of said lever to lock the latter to retain the formers in said loop forming relation, a trip member formed on said locking means and positioned in said exit so as to be moved by the leading edge of said strip during the passage thereof through said exit to move said locking means to release said lever, and a portion of said lever then engaging said locking means to hold said trip out of said exit to permit the free passage of the film strip therethrough.

2. A self-threading mechanism for a motion-picture projector having a film gate and a film exit comprising, in combination, a film feeding sprocket positioned on each side of said gate, a loop former arranged adjacent each sprocket to form a loop in the film on opposite sides of said gate, a single pivoted lever having different parts thereof directly connected to said formers and movable in one direction to shift said formers to loop forming relation, a spring actuated member rendered operative upon the movement of said lever in said one direction to engage another part of said lever to hold the latter to retain the formers in loop forming relation, a trip positioned in said exit and connected to said member and adapted to be engaged and moved by said film as the latter is fed through said exit to move said member out of holding relation with said lever, means for moving the relieved lever in another direction to shift said formers out of loop forming relation, and a section on said lever engaging said member to retain said trip out of said exit to permit the free passage of film therethrough.

3. In a self-threading mechanism for a projector having a film entrance the combination with, means for feeding and guiding said film through said projector, loop formers movable into and out of loop forming relation, of a member positioned to block said entrance to prevent the feeding of said film thereinto, and means for operatively connecting said member of said loop formers whereby the movement of said formers to loop forming position serves to move said blocking member out of entrance-blocking position.

4. In a self-threading mechanism for a projector having a film entrance the combination with, means for feeding and guiding said film through said projector, loop formers movable into and out of loop forming relation, of a movable member normally tending to close said entrance to prevent the feeding of said film thereinto but connectable to said formers when the latter are moved to said loop-forming position for movement out of entrance-closing position.

5. In a self-threading mechanism for a projector having a film entrance the combination with, means for feeding and guiding said film through said projector, loop formers movable into and out of loop-forming relation, a pivoted lever connected to said formers and movable in one direction for moving the latter to loop-forming relation, of a freely mounted blocking member positioned to block said entrance when no film is positioned therein, a releasable connection between said member and lever by which the movement of said lever to shift the formers to loop-forming position simultaneously connects said member to said lever for movement thereby to open said entrance to permit said film to be inserted thereinto and to said feeding means, and means for moving said lever in another direction to move said formers out of loop-forming relation, the movement of said lever in said other direction disconnecting said lever from said member to free the latter so that it may ride on and be supported by said film during the passage thereof through said entrance, but automatically drop to close said entrance when the trailing end of the film has passed therethrough.

6. A self-threading mechanism for a motion-picture projector having a film entrance and a film exit comprising, in combination, means for feeding a film strip through said apparatus, means for blocking said entrance to prevent the feeding of said strip thereinto, movable film loop formers, means for moving said formers to loop-forming position, a releasable connection between said blocking means and said moving means by which the movement of the latter to position the formers in loop-forming position also moves said blocking means out of blocking relation to permit the feeding of said strip into said entrance, means for holding said moving means in a position to retain said formers in loop-forming relation, and a trip positioned in said exit and operatively connected to said holding means, said trip being positioned in the path of the leading edge of said strip and actuated thereby to move said holding means out of holding relation with said lever to enable said formers to move out of loop-forming relation, said lever then engaging said holding means to retain said trip out of said exit.

7. A self-threading mechanism for a motion-picture projector having a film entrance, a film exit, and a film gate comprising, in combination, means for feeding a film strip through said entrance, gate, and exit, a member positioned to block said entrance when no film is positioned therein, movable film loop formers positioned on opposite sides of said gate, a pivoted lever operatively connected to said gate and said loop formers and movable in one direction to simultaneously release the film at said gate and to move said formers to loop-forming position and to move said member out of blocking position to permit the feeding of said film into said entrance and to said feeding means, holding means adapted to engage said lever when the latter is moved in said one direction to hold said lever, a trip on said holding means positioned in the exit, and in the path of the leading edge of said strip so as to be moved thereby to shift said holding means out of holding relation with said lever, means for then moving said lever in other direction to shift said formers out of loop-forming position, to engage said film strip at said gate and to disconnect said lever from said blocking member, the latter then riding on said film until the trailing end passes through said entrance whereupon the blocking member then moves to block said entrance, and a portion of said lever being positioned to engage said holding means when said lever is moved in the other direction to retain said trip out of the path of the film passing through said exit.

8. A self-threading mechanism for a motion-picture projector having a film gate, comprising, in combination, a feed sprocket positioned above and a film feeding sprocket positioned below said gate, a film loop former positioned adjacent each sprocket, said projector having a film exit adjacent said upper sprocket and a film exit adjacent said lower sprocket, a pivoted lever directly connected to said formers and movable in one direction to shift said formers to loop-forming position, a blocking member associated with said upper sprocket and positionable to close said entrance to prevent the feeding of a film thereinto, a releasable connection for connecting said member to said lever when the latter is moved in said one direction to shift said member to open said entrance, a spring pressed lug adapted to engage and hold said lever when the latter has been moved in said one direction, a trip formed on said lug and extending into said entrance and adapted to be engaged and moved by the leading edge of said film during the passage thereof through said exit to disengage said lug from said lever to free the latter, means for moving said lever in other direction to shift said formers out of loop-forming position, said last movement of said lever disconnecting said lever from said member so that the latter will ride freely on the film passing through said entrance but will automatically drop to close said entrance when the film therein becomes exhausted, and means on said lever adapted to engage said lug when said lever is moved in said other direction to retain said trip out of said exit and the path of the film passing therethrough.

9. In a projector formed with a film gate having an aperture, the combination with loop formers movable to a position to form loops in a film strip above and below said gate, of a guide member positioned adjacent said gate, and means operatively connecting said member to said formers when the latter are moved to loop-forming position to move said member to overlie the bottom edge of said aperture to guide the leading edge of said strip thereacross when fed lengthwise through said gate.

10. A self-threading mechanism for a motion-picture projector having a gate aperture, the combination with means for feeding a film strip lengthwise through said gate, loop formers positioned on opposite sides of said gate, means for moving said gate, of a slide member positioned adjacent said gate, a detachable connection between said member and said formers to move said member to close said aperture when said formers are moved to loop-forming position, and a lip on said member adapted to overlie the lower edge of said aperture when said member is moved to aperture closing position to guide the leading end of the film strip over said edge.

11. A self-threading mechanism for a motion-picture projector having a gate aperture, the combination with means for feeding a film strip lengthwise through said gate, loop formers positioned on opposite sides of said gate, means for moving said formers in one direction to form film loops above and below said gate, of a slide member positioned adjacent said gate, a detachable connection between said member and said formers to move said member to close said aperture when said formers are moved to loop-forming position, a lip on said member adapted to overlie the lower edge of said aperture when said member is moved to aperture closing position to guide the leading end of the film strip over said edge, said formers being also movable in another direction and out of engagement with said strip after said loops have been formed, and means independent of said formers for shifting said member to uncover said aperture when said formers have been moved in said other direction.

12. A self-threading mechanism for motion-picture projector having a gate aperture comprising, in combination, means for feeding a film strip lengthwise through said projector and past said aperture, loop formers movable to one position to form film loops above and below said aperture, means directly connected to said formers to move the latter to and from film loop-forming position, a slide member connectable to said formers and movable thereby when the latter are moved to loop-forming position to close said gate aperture, a lip formed on said member adapted to overlie the lower edge of said aperture when in aperture closing relation to guide the leading end of the film strip past said aperture, and means independent of said formers for moving said member to uncover said aperture when said formers are moved from said loop-forming position.

13. A self-threading mechanism for a projector having a film gate formed with an aperture, a film entrance, and a film exit comprising, in combination, means for feeding a film strip lengthwise through said projector and gate, movable loop formers for said film strip positioned above and below said gate, a pivoted blocking member adapted to close said entrance to prevent the feeding of a film strip thereinto, a pivoted lever directly connected to said formers and movable in one direction to move said formers to loop-forming position, a releasable connection between said lever and said blocking member to move the latter out of blocking relation when said lever is moved in said one direction to open said entrance to permit the feeding of the film strip therewith and to said feeding means, a slide member adapted to close said aperture, a releasable connection between said slide member and said formers for moving said slide member to aperture closing position when said formers are moved to loop-forming position, a lip on said slide member adapted to overlie the lower edge of said aperture when the latter is closed to guide the leading end of said strip over said edge, a pivoted holding member adapted to engage and hold said lever when the latter has been moved to said one position, means on said lever for releasing the film in said gate when the lever has been moved in said one direction, a trip carried by said holding member and positioned in said exit and in the path of the leading edge of said film strip so as to be moved by said leading edge to move said holding member out of holding relation with said lever, spring means to move the released lever in other direction to shift said formers out of loop-forming position and to engage said film at said gate, the movement of said lever in said other direction serving to disconnect the lever from said blocking member so that the latter is free to ride loosely on the film strip until the trailing end passes through said entrance whereupon the blocking member will automatically move to blocking position, said lever when moved in said other direction engaging said holding member to retain said trip out of said exit, and means independent of said formers for moving said slide member to uncover said aperture when said formers are moved out of loop-forming position.

MICHAEL DIETRICH.

REFERENCES CITED

The following references are of record in the file of this patent:

UNITED STATES PATENTS

| Number | Name | Date |
| --- | --- | --- |
| 1,987,406 | May | Jan. 8, 1935 |
| 2,024,660 | Riddel | Dec. 17, 1935 |